United States Patent

Schamberg et al.

[11] Patent Number: 5,091,002
[45] Date of Patent: Feb. 25, 1992

[54] PREPARATION FOR THE WATER-REPELLENT IMPREGNATION OF POROUS MINERAL BUILDING MATERIALS

[75] Inventors: Eckehard Schamberg; Götz Koerner, both of Essen; Herwig Fritsch, Gladbeck; Manfred Grasse, Unna; Roland Sucker, Werne, all of Fed. Rep. of Germany

[73] Assignee: Th. Goldschmidt AG, Essen, Fed. Rep. of Germany

[21] Appl. No.: 492,086

[22] Filed: Mar. 12, 1990

[30] Foreign Application Priority Data

Apr. 8, 1989 [DE] Fed. Rep. of Germany ....... 3911479

[51] Int. Cl.$^5$ ............. C04B 41/64; C09D 3/82
[52] U.S. Cl. .................. 106/2; 106/287.16; 106/287.14; 524/801; 524/837; 427/421; 427/136
[58] Field of Search ............ 106/2, 287.16, 287.14; 524/801, 837; 427/421, 136

[56] References Cited

U.S. PATENT DOCUMENTS

| 4,100,124 | 7/1978 | Ichikawa et al. | 524/837 |
| 4,209,432 | 6/1980 | Roth | 106/287.14 |
| 4,582,874 | 4/1986 | Grape et al. | 524/837 |

FOREIGN PATENT DOCUMENTS 0234029 9/1987 European Pat. Off.

*Primary Examiner*—William R. Dixon, Jr.
*Assistant Examiner*—Carol Bonner
*Attorney, Agent, or Firm*—Toren, McGeady & Associates

[57] ABSTRACT

A composition is disclosed which is useful for the water-repellent impregnation of porous mineral building materials. The composition is based on organosilicon compounds which contain alkoxy groups and comprises an emulsion which contains 2.5 to 25% by weight of an alkoxysilane of the formula $$R^1\text{-Si}(OR^2)_3$$

wherein
$R^1$ is an alkyl group with 3 to 12 carbon atoms and
$R^2$ is a methyl or ethyl group, 2 to 20% by weight of an alkoxysiloxane of the formula $$R_a^3\text{—Si}(OR^2)_b$$
$$O_{\frac{4-(a+b)}{2}}$$

wherein
$R^3$ is an alkyl group with 1 to 6 carbon atoms
$a$ is 0.8 to 1.2 and
$b$ is 0.2 to 1.2, 0.01 to 5% by weight of an emulsifier, 0.01 to 0.1% by weight of fillers with an effective surface area of at least 40 m$^2$/g and 49.9 to 95.48% by weight of water. The composition has a long shelf life and, due to its high penetration, a high water-repellent effect on the surface, as well as deep within, all mineral building materials.

11 Claims, No Drawings

PREPARATION FOR THE WATER-REPELLENT IMPREGNATION OF POROUS MINERAL BUILDING MATERIALS

BACKGROUND OF THE INVENTION

This invention relates to a composition for the water-repellent impregnation of porous, mineral building materials and this invention relates more particularly to a composition based on organosilicon compounds containing alkoxy groups which is useful to enhance the water repellency of such building materials.

Organosilanes or organosiloxanes have been used for many years to impregnate porous mineral building materials, in order to protect them against penetration by water. It is particularly important for this hydrophobizing treatment that the active ingredients penetrate deeply into the building material and combine chemically or physically with the building material.

Penetration into the building material is favored by using compounds of the lowest possible molecular weight as active organosilicon ingredients. The depth of penetration can be improved additionally by the concomitant use of organic solvents, which evaporate after the treatment of the building material. High reactivity is attained by using organoalkoxysilanes and/or organoalkoxysiloxanes, which can condense under the influence of moisture and react with the building material as organosilicon compounds. At the same time, the alcohol, which corresponds to the alkoxy group, is split off and evaporated into the atmosphere.

German Patent 3,312,911 discloses such a preparation, which contains organopolysiloxanes of the general formula

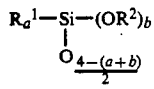

wherein
$R^1$ is an alkyl or aryl group,
$R^2$ is an alkyl group with 1 to 4 carbon atoms,
a = 0.8 to 1.5 and
b ≦ 2.

This preparation is characterized by a composition consisting of:

a) 1 to 20% by weight of a mixture of organoalkoxysiloxanes of the aforementioned formula, which consists of 25 to 75% by weight of a siloxane, the b value of which is 0.1 to 0.5, and of 75 to 25% by weight of a siloxane, the b value of which is 0.8 to 2.0, wherein a+b are less than or equal to 3, b) 80 to 99% by weight of a solvent that is not miscible with water and c) optionally, known condensation catalysts.

The essential characteristic of this preparation is that the impregnation is carried out not with an organoalkoxysiloxane, the molecular weight distribution of which essentially has only a single maximum, but with a mixture of organoalkoxysiloxanes, the characteristic feature of which consists of a different degree of condensation. By these means, high depth of penetration, associated with a high effectiveness, especially on alkaline building materials, and a good, optically visible water beading effect are assured.

German Patent 3,312,911 discloses preparations which have proven their value in practice. Essentially, an improvement in these preparations is possible only with respect to the depth of penetration that is achievable in actual use. This depth of penetration is affected principally by three factors, namely: the solvent used, the porosity of the building material and the care with which this preparation is used. Improvements in impregnating preparations must therefore be measured particularly by the penetration behavior.

As a result of a greater awareness of the environment, the use of organic solvents is increasingly perceived to be disturbing. Therefore, special efforts have been made to develop comparable preparations based on aqueous compositions.

Further developmental work has led to a method, which is the object of German Patent 3,627,060. This patent relates to a method for impregnating mineral building materials, particularly masonry, with aqueous solutions of silanols and/or siloxanols, which are produced at the site of their use by hydrolysis of alkoxysilanes and/or alkoxysiloxanes. As alkoxysilanes and/or alkoxysiloxanes, compounds of the following general formula are selected

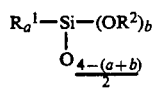

wherein
$R^1$ is an alkyl group with 1 to 8 carbon atoms, at least 90% of the $R^1$ groups in the average molecule being alkyl groups with 1 to 4 carbon atoms,
$R^2$ is a methyl or ethyl group,
a is 0 to 1.5,
b is 1.0 to 4.0 and
a+b is 2.0 to 4.0.

These compounds are hydrolyzed continuously in an amount corresponding to their consumption. The solution obtained is applied on the mineral building material within a period of 3 to 30 minutes after the reactants are mixed.

With this method, a high penetration of the aqueous preparations into the mineral building material is achieved. This penetration is comparable to that achieved when organic solvent containing preparations are used.

However, because of their instability, these solutions must be produced at the place where they are to be used, as required by German Patent 3,627,060.

An aqueous silane emulsion for hydrophobizing ceramic materials is disclosed in published European Patent Application 0 234 024. This emulsion consists essentially of a) 1 to 40% by weight of a hydrolyzable silane with a molecular weight of up to about 500 and the general formula $R_nSi(R')_{4-n}$, wherein R' is an optionally halogenated hydrocarbon group with 1 to 20 carbon atoms, R' is an alkoxy group with 1 to 3 carbon atoms, a halogen, an amino or a carboxyl group, and n is 1 or 2, or the oligomers of these silanes and b) 0.5 to 50% by weight, based on the silane, of an emulsifier with an HLB value of 4 to 15 and c) water.

Octyltriethoxysilane is named as an especially preferred silane.

In actual fact, emulsions of such silanes, in which the R group has more than 6 carbon atoms, have an increased stability, since the rate of hydrolysis of these reactive silanes is decreased. However, it is disadvantageous that the hydrolysis of these silanes in the building material is also, necessarily, correspondingly slow and must be catalyzed in a suitable manner. In some building materials, such as fresh concrete, this is possible due to the high alkalinity. This is not possible, however, in neutral or weakly alkaline building materials, such as burned clinker or numerous natural stones. Without such a catalyst, there is no anchoring of the silanes to the surface of the building material. The silanes can evaporate from the surface or be removed mechanically. This leads to a depletion of silane at the surface and thus to a decrease in the hydrophobization. As a consequence, the water beading effect is weak or not present at all. The water absorption capacity in the depleted surface layer is high, so that especially this layer, which is particularly exposed to weathering and mechanical attack, is insufficiently protected. Thus, these preparations can be used only for certain building materials.

SUMMARY OF THE INVENTION

It is an object of the invention to provide an improved aqueous composition for the water-repellent impregnation of porous, mineral building materials.

It is also an object of the invention to provide an aqueous composition which has a high water-repellent action on all useful building material surfaces, alkaline, as well as neutral.

A further object of the invention is the provision of a composition which substantially enhances the water-repellency of all building materials and which has a long shelf life.

These and other objects of the invention are attained by the invention described below.

Surprisingly, it has been found that the desired properties are found in a preparation which, according to the invention, is an emulsion containing: 2.5 to 25% by weight of an alkoxysilane of the formula $$R^1-Si(OR^2)_3 \qquad \qquad I$$

wherein
$R^1$ is an alkyl group with 3 to 12 carbon atoms and
$R^2$ is a methyl or ethyl group,
2 to 20% by weight of an alkoxysiloxane of the formula

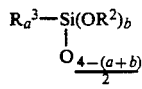

wherein
$R^3$ is an alkyl group with 1 to 6 carbon atoms,
a is 0.8 to 1.2 and
b is 0.2 to 1.2,
0.01 to 5% by weight of an emulsifier, 0.01 to 0.1% by weight of filler with an effective surface area of at least 40 m²/g and 49.9 to 95.48% by weight of water.

The $R^1$ group of the alkoxysilane of formula I is an alkyl group with 3 to 12 carbon atoms. This alkyl group may be linear or branched. Examples of such alkyl groups are the hexyl, octyl, nonyl, isononyl, decyl and dodecyl groups. Linear alkyl groups with 3 to 8 carbon atoms are preferred, those with 6 to 8 carbon atoms being especially preferred.

The $R^2$ group in formulas I and II is a methyl or ethyl group. For physiological reasons, $R^2$ preferably is the ethyl group, since ethanol is released in this case by the hydrolysis.

The $R^3$ group of the alkoxysiloxane of the formula II is an alkyl group with 1 to 6 carbon atoms. Once again, the alkyl group may be linear or branched. Suitable $R^3$ groups are the methyl, ethyl, propyl, isopropyl, butyl, isobutyl and hexyl groups. Linear alkyl groups with 1 to 4 carbon atoms are particularly preferred.

The subscript a, which indicates the number of alkyl groups linked to silicon atoms in the average molecule of formula II, has a value of 0.8 to 1.2 and preferably one of 1.0.

The subscript b describes the number of alkoxy groups per silicon atoms in the average molecule. Subscript b has a value of 0.2 to 1.2. The sum of a+b should fall within the range of 1.2 to 2.4.

Nonionic emulsifiers are generally used as emulsifiers. These are addition products of alkylene oxides, preferably ethylene oxide, and compounds with an acidic hydrogen, such as, preferably, fatty alcohols or alkylphenols, such as octylphenol, nonylphenol or dodecylphenol. The content of oxyethylene units should be such that the HLB value of the emulsifiers lies between 6 and 14 and particularly between 8 and 12.

Ionic emulsifiers, such as alkanesulfonates, can also be used.

The composition of the invention may additionally contain catalysts. Advisably, catalysts, when used, are added immediately before the preparation is applied.

As catalysts, emulsions of organometallic compounds, such as tin dibutyl dilaurate, are generally used. The use of catalysts is not mandatory. However, such use is always appropriate whenever neutral building materials, such as burned clinker, are to be treated and the effectiveness is to be fully developed after a short time, for example, when the effectiveness is to be tested after only 1 to 2 days.

The inventive preparation is prepared preferably by mixing an emulsion A, which contains the alkoxysilane, with an emulsion B, which contains the alkoxysiloxane.

Emulsions A and B can be prepared by mixing the alkoxysilane or the alkoxysiloxane with the emulsifier and introducing the required amount of water, at an elevated temperature if necessary. It is also possible to disperse the emulsifier in a small amount of water, such as 5 to 10% by weight, to stir the silane or siloxane in this mixture and to dilute the stock emulsion, thus obtained, with the remaining water. The use of emulsifying equipment, such as that working on the rotor/stator principle, or the use of so-called colloid mills, may also be helpful and makes possible the preparation of emulsions with particularly small particles.

It is also known from the art that the water-beading effect of such preparations can be improved further by the addition of suitable fillers. These fillers accumulate at the surface of the building material and favor the hydrophobization of the surface. Therefore, the compositions of the invention preferably also contain 0.01 to 2% by weight, more preferably 0.01 to 0.1% by weight and most preferably 0.01 to 0.09% by weight (based on the weight of the composition) of fillers with an effective surface area of at least 40 m²/g. In general and also within the scope of the invention, the use of hydrophobic silica is preferred. Hydrophobic silica is obtained, for example, by hydrophobizing silica, which is obtained by flame hydrolysis, with organosilicon compounds and particularly with silanes.

If emulsion A were used alone to impregnate porous building materials, the disadvantages of the European Patent Application 0 234 024 would be apparent, since alkoxysilanes of formula I would not react on a neutral substrate.

If emulsion B were used by itself, the penetration capability would be insufficient; building surfaces with fine pores would exhibit an inadequate water-repelling effect.

Surprisingly, however, it has been found that the preparation of the invention has a long shelf life and exhibits a high water-repelling effect on all surfaces of porous mineral building materials, including a neutral substrate. Due to the high penetration, it is effective at a relatively great depth. The preparation also produces external surfaces of high hydrophobic effectiveness.

The following examples of the production and composition of preparations of the invention further illustrate the best mode currently contemplated for carrying out the invention, but these illustrative examples must not be construed as limiting the invention in any manner. The properties of compositions of the invention have also been shown in comparison with the properties of emulsion A and of emulsion B, when each emulsion is used alone.

EXAMPLE 1

Preparation of an Emulsion

Water (50 kg), which contains all of the emulsifier (a mixture of secondary alkanesulfonates; CAS Reg. No. 68608-26-4) is added to the mixing vessel and 50 kg of alkylalkoxysilane/alkylalkoxypolysiloxane (active ingredient) is added with stirring. The mixture is subsequently homogenized four times with a gap-type homogenizer at 400/20 bar. The temperature is maintained at 10° to 20° C. by cooling.

Before use, the emulsion is diluted with water to the desired active ingredients content.

The emulsifier content given is always related to the active ingredient.

Emulsion A

Active ingredient: octyltriethoxysilane
Emulsifier: 5% by weight

Emulsion B

Active ingredient: methylethoxypolysiloxane of the formula $$CH_3-Si(OC_2H_5)_{0.2}$$
$$|$$
$$O_{1.4}$$

Emulsifier: 5% by weight

Emulsion C

Emulsion C is prepared by mixing emulsions A and B. The ratio of emulsion A to emulsion B is 1:1.

Testing the Properties of the Composition

The results of testing the composition are given in Table 1.

TABLE 1

| Emulsion | Emulsifier (% by weight) | Active Ingredient (% by weight) | Beading Effect | Water Absorption (% by weight) | Depth of Impregnation (mm.) |
|---|---|---|---|---|---|
| A | 5 | 10 | 7 | 13.2 | 10 |
| B | 5 | 10 | 5 | 12.6 | 3 |
| C | 5 | 10 | 4 | 7.8 | 10 |
| untreated | | | 7 | 15.5 | — |

Substrate: clinker

Example 1 shows that the test results obtained with the inventive preparation from alkylalkoxysilane and alkylalkoxypolysiloxane (emulsion C) are clearly better than those obtained with the emulsion of alkylalkoxypolysiloxane (emulsion B), which is not of the invention.

The tests are carried out in the following manner.

The test specimens (clinker: 12 ×12 ×6 cm; lime sand brick: cubes with a 6 cm edge length), after having been acclimatized for 1 week under standard climatic conditions (20° C.; 65% R.H.), are immersed for 60 seconds in the impregnating solution and dried under the same standard, climatic conditions. The properties are tested, as usual, 1 week after the impregnation.

The beading effect is determined in the following manner.

Tap water (1 ml) is carefully deposited on the horizontal test surface with a pipette. After 10 minutes, the water still present on the surface is shaken off and the contact area of the water droplet is evaluated visually and graded according to the following standards.

1 = no wetting of the contact area
2 = 50% of the contact area is wetted
3 = 100% of the contact area is wetted
4 = water partly absorbed; slight darkening of the contact area
5 = at least 50g of the water has been absorbed; greater darkening of the contact area
6 = droplet absorbed completely; contact area much darker
7 = water droplet absorbed completely in less than 5 minutes The water absorption is measured in the following manner.

The test specimens are stored for 24 hours under a 5 cm head of water. They are subsequently taken out of the water and, after the externally adhering water is removed with filter paper, weighed. The water absorption is calculated using the following formula:

Water absorption (% by weight) = $(a-b) \times 100 / b$ a = weight of the test specimen after it has been stored in water
b = weight of the test specimen before it has been stored in water The depth of penetration (depth of impregnation) is measured in the following manner.

The test specimens are split and the fractured surfaces are wetted with water. The bright edge is measured.

EXAMPLE 2

Preparation of an Emulsion Jointly from Octyltriethoxysilane and Methylethoxypolysiloxane of the Formula

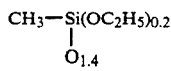

The active ingredients are mixed and emulsified jointly, as described in Example 1.

Emulsions D to F

The weight ratio of silane to siloxane is 1:1.
The emulsions differ in their emulsifier content (Table 2).

Testing the Composition

The test results are given in Table 2.

TABLE 2

| Emulsion | Emulsifier (% by weight) | Active Ingredient (% by weight) | Beading Effect | Water Absorption (% by weight) | Depth of Impregnation (mm.) |
|---|---|---|---|---|---|
| D | 5 | 10 | 4 | 7.2 | 10 |
| E | 0.45 | 10 | 3 | 2.0 | 10 |
| F | 0.1 | 10 | 2 | 0.6 | 10 |
| untreated | | | 7 | 15.5 | — |

Substrate: clinker

Emulsions D and E are entirely usable even after being stored for 12 months at room temperature. On the other hand, emulsion F had a shelf life of only about 6 months.

Example 2 shows that preparing an emulsion jointly from alkylalkoxysilane and alkylalkoxypolysiloxane (emulsion D) leads to results, with respect to the beading effect and the water absorption, which are comparable with those obtained if the emulsions are prepared separately and mixed before their application (emulsion C). Moreover, the example clearly shows that the effectiveness can be increased by decreasing the emulsifier content. The shelf life is still adequate even at a lower emulsifier concentration.

EXAMPLE 3

An emulsion of octyltriethoxysilane and methylethoxypolysiloxane was prepared as in Example 2. This emulsion (emulsion G), however, contains 0.09% by weight of a conventional, commercial hydrophobic silica, based on the active ingredient. The application properties of emulsion G are compared with those of emulsion F from Example 2.

Testing the Properties of the Compositions

The results of testing the compositions are given in Table 3.

TABLE 3

| Emulsion | Emulsifier (% by weight) | Active Ingredient (% by weight) | Beading Effect | Water Absorption (% by weight) | Depth of Impregnation (mm.) |
|---|---|---|---|---|---|
| G | 0.1 | 10 | 1 | 0.7 | 10 |
| F | 0.1 | 10 | 2 | 0.6 | 10 |
| untreated | | | 7 | 15.5 | — |

Substrate: clinker

Example 3 shows clearly that the water beading effect can be improved by the addition of hydrophobic silica, while the water absorption and the depth of penetration of the impregnating agent remain substantially unaffected.

EXAMPLE 4

To emulsion E of Example 2, 1% by weight of a 10% by weight emulsion of tin dibutyl dilaurate is added. The total catalyst content in the ready-for-use emulsion H thus is 0.1% by weight. The application properties of emulsion H are compared with those of emulsion E of Example 2.

Testing the Properties of the Compositions

Tests of the compositions are carried out after 24 hours. The results are given in Table 4.

TABLE 4

| Emulsion | Emulsifier (% by weight) | Active Ingredient (% by weight) | Beading Effect | Water Absorption (% by weight) | Depth of Impregnation (mm.) |
|---|---|---|---|---|---|
| Substrate: clinker (neutral building material) | | | | | |
| H | 0.45 | 10 | 1–2 | 2.9 | 10 |
| E | 0.45 | 10 | 3–4 | 5.8 | 10 |
| untreated | | | 7 | 15.5 | — |
| Substrate: untreated lime sand brick (alkaline building material) | | | | | |
| H | 0.45 | 10 | 2 | 1.8 | 5 |
| E | 0.45 | 10 | 2–3 | 1.9 | 5 |
| untreated | | | 7 | 12.8 | — |

Example 4 shows that better effectiveness can be achieved on neutral building materials such as clinker by the addition of a catalyst, especially if the application is to be tested after only a short time.

EXAMPLE 5

Emulsion K is prepared from emulsion E of Example 2. The application tests of the two emulsions are compared.

Testing the Properties of the Compositions

The test results are shown in Table 5.

TABLE 5

| Emulsion | Emulsifier (% by weight) | Active Ingredient (% by weight) | Beading Effect | Water Absorption (% by weight) | Depth of Impregnation (mm.) |
|---|---|---|---|---|---|
| K | 0.45 | 5 | 3 | 2.5 | 10 |
| E | 0.45 | 10 | 2–3 | 2.1 | 10 |
| untreated | | | 7 | 15.5 | — |

Substrate: clinker

This example shows that even a reduced content of active ingredients of only 5% by weight can lead to a good impregnation effect. The depth of penetration is practically unaffected.

SURVEY TABLE

| Example No. | Emulsion Type | Preparation | Emulsifier (% by weight) | Active Ingredient (% by weight) | SiO$_2$ (% by weight) | Tin Dibutyl Dilaurate (% by weight) | Beading Effect | Water Absorption (% by weight) | Depth of Impregnation (% by weight) |
|---|---|---|---|---|---|---|---|---|---|
| 1 | A | — | 5 | 10 | — | — | 7 | 13.2 | 10 |
| 1 | B | — | 5 | 10 | — | — | 5 | 12.6 | 3 |
| 1 | C | 2 | 5 | 10 | — | — | 4 | 7.8 | 10 |
| 1 | — | — | — | — | — | — | 7 | 15.5 | — |
| 2 | D | 1 | 5 | 10 | — | — | 4 | 7.2 | 10 |
| 2 | E | 1 | 0.45 | 10 | — | — | 3 | 2.0 | 10 |
| 2 | F | 1 | 0.1 | 10 | — | — | 2 | 0.6 | 10 |
| 2 | — | — | — | — | — | — | 7 | 15.5 | — |
| 3 | G | 1 | 0.1 | 10 | 0.09 | — | 1 | 0.7 | 10 |
| 3 | F | 1 | 0.1 | 10 | — | — | 2 | 0.6 | 10 |
| 3 | — | — | — | — | — | — | 7 | 15.5 | — |
| 4* | H | 1 | 0.45 | 10 | — | 0.1 | 1-2 | 2.9 | 10 |
| 4* | E | 1 | 0.45 | 10 | — | — | 3-4 | 5.8 | 10 |
| 4* | — | — | — | — | — | — | 7 | 15.5 | — |
| 4** | H | 1 | 0.45 | 10 | — | 0.1 | 2 | 1.8 | 5 |
| 4** | E | 1 | 0.45 | 10 | — | — | 2-3 | 1.9 | 5 |
| 4** | — | — | — | — | — | — | 7 | 12.8 | — |
| 5 | K | 1 | 0.45 | 5 | — | — | 3 | 2.5 | 10 |
| 5 | E | 1 | 0.45 | 10 | — | — | 2-3 | 2.1 | 10 |
| 5 | — | — | — | — | — | — | 7 | 15.5 | — |

*Test 24 hours after impregnation on clinker (shortened curing time)
**Test 24 hours after impregnation on lime sand brick (shortened curing time)
Preparation
1 = joint emulsification of the components
2 = mixing of emulsions A and B

We claim:

1. A composition for the impregnation of porous mineral building materials to protect such materials against penetration by water comprising an emulsion of 2.5 to 25% by weight of an alkoxysilane of the formula $$R^1\text{-Si}(OR^2)_3$$

wherein
$R^1$ is an alkyl group with 3 to 12 carbon atoms and
$R^2$ is a methyl or ethyl group,
2 to 20% by weight of an alkoxysiloxane of the formula $$R_a^3\text{—Si}(OR^2)_b$$
$$\underset{O_{\frac{4-(a+b)}{2}}}{|}$$

wherein
$R^3$ is an alkyl group with 1 to 6 carbon atoms
a is 0.8 to 1.2 and
b is 0.2 to 1.2,
0.01 to 5% by weight of an emulsifier, 49.9 to 95.48% by weight of water.

2. The composition of claim 1, in which the $R^2$ group is an ethyl group.

3. The composition of claim 1, in which the emulsifier is present in an amount of 0.01 to 0.5% by weight.

4. The composition of claim 1, in which the emulsifier is effective to emulsify the alkoxysilane and alkoxysiloxane with water.

5. The composition of claim 1, in which the emulsifier is a nonionic emulsifier.

6. The composition of claim 1, in which the sum of a+b is within the range of 1.2 to 2.4.

7. The composition of claim 1, which also contains a catalyst which is an emulsion of an organometallic compound.

8. The composition of claim 1, which is obtained by mixing an emulsion containing the alkoxysilane, with an emulsion, containing the alkoxysiloxane.

9. A method for protecting porous mineral building materials against penetration by water comprising impregnating said porous mineral building materials with a composition comprising an emulsion of 2.5 to 25% by weight of an alkoxysilane of the formula $$R^1\text{-Si}(OR^2)_3$$

wherein
$R^1$ is an alkyl group with 3 to 12 carbon atoms and
$R^2$ is a methyl or ethyl group, 2 to 20% by weight of an alkoxysiloxane of the formula $$R_a^3\text{—Si}(OR^2)_b$$
$$\underset{O_{\frac{4-(a+b)}{2}}}{|}$$

wherein
$R^3$ is an alkyl group with 1 to 6 carbon atoms
a is 0.8 to 1.2 and
b is 0.2 to 1.2,
0.01 to 5% by weight of an emulsifier, and 49.9 to 95.48% by weight of water.

10. The composition of claim 1, further comprising 0.01 to 0.1% by weight of filler with an effective surface area of at least 40 m$^2$/g.

11. The composition of claim 10 in which the filler is hydrophobic silica.

* * * * *